(12) United States Patent
Agarwal et al.

(10) Patent No.: US 8,979,074 B2
(45) Date of Patent: Mar. 17, 2015

(54) AIR SPRINGS WITH IMPROVED HIGH TEMPERATURE PERFORMANCE

(75) Inventors: Sheel Agarwal, Stow, OH (US); Russell W. Koch, Hartville, OH (US)

(73) Assignee: Firestone Industrial Products, LLC, Indianapolis, IN (US)

( * ) Notice: Subject to any disclaimer, the term of this patent is extended or adjusted under 35 U.S.C. 154(b) by 233 days.

(21) Appl. No.: 13/522,522

(22) PCT Filed: Jan. 18, 2011

(86) PCT No.: PCT/US2011/021523
§ 371 (c)(1),
(2), (4) Date: Oct. 5, 2012

(87) PCT Pub. No.: WO2011/088448
PCT Pub. Date: Jul. 21, 2011

(65) Prior Publication Data
US 2013/0020746 A1    Jan. 24, 2013

Related U.S. Application Data

(60) Provisional application No. 61/295,820, filed on Jan. 18, 2010.

(51) Int. Cl.
*F16F 9/04* (2006.01)
*F16F 1/36* (2006.01)
*F16F 9/05* (2006.01)

(52) U.S. Cl.
CPC ............. *F16F 9/0409* (2013.01); *F16F 1/3605* (2013.01); *F16F 9/0445* (2013.01); *F16F 9/05* (2013.01); *F16F 9/052* (2013.01)

USPC ......................................................... 267/64.19

(58) Field of Classification Search
USPC ........................................... 267/64.19–64.28
See application file for complete search history.

(56) References Cited

U.S. PATENT DOCUMENTS

| | | | |
|---|---|---|---|
| 3,319,952 A | 5/1967 | Travers et al. | |
| 2006/0131797 A1 | 6/2006 | Kerstetter | |
| 2006/0287434 A1 | 12/2006 | Wood et al. | |
| 2008/0111288 A1 | 5/2008 | Howard et al. | |
| 2009/0232054 A1* | 9/2009 | Wang et al. | 370/328 |
| 2009/0234054 A1* | 9/2009 | Nagamori et al. | 524/263 |
| 2010/0183856 A1 | 7/2010 | Kind | |

FOREIGN PATENT DOCUMENTS

| WO | WO2008/051253 A1 | 5/2008 |
|---|---|---|
| WO | WO2011/088448 A1 | 7/2011 |

OTHER PUBLICATIONS

International Search Report for International Appl. No. PCT/US2011/021523 dated Mar. 22, 2011; 3 pages.
International Preliminary Report on Patentability for International Appl, No. PCT/US2011/021523 dated Jul. 24, 2012; 6 pages.
Copending application No. 13/445,529 filed Apr. 12, 2012 entitled "Air Springs With Improved High Temperature Performance", 20 pages.

\* cited by examiner

*Primary Examiner* — Melanie Torres Williams
(74) *Attorney, Agent, or Firm* — Jason A. Houser; Arthur M. Reginelli

(57) ABSTRACT

An air spring bellow comprising a vulcanized rubber component including the at least partially vulcanized residue of hydrogenated nitrile rubber and a rubber other than hydrogenated nitrile rubber.

17 Claims, 4 Drawing Sheets

AIR SPRINGS WITH IMPROVED HIGH TEMPERATURE PERFORMANCE

This application is a Continuation Application of International Application Ser. No. PCT/US2011/021523, filed Jan. 18, 2011, which claims the benefit of U.S. Provisional Application Ser. No. 61/295,820, filed on Jan. 18, 2010, both of which are incorporated herein by reference.

FIELD OF THE INVENTION

Embodiments of the present invention are directed toward air springs, and more particularly the bellows of air springs, that have improved high temperature performance.

BACKGROUND OF THE INVENTION

Air springs, or pneumatic suspension devices, have long been used to isolate road disturbances from a vehicle, seat, or cab. An air spring, as part of a vehicle's suspension, supports the vehicle's load or mass at each axle. Typically, each axle of a vehicle associated with an air spring supports the mass component or load carried by the axle. In addition, there may be ancillary air springs that support driver comfort in and around the driver's compartment, or cab. In an air spring, a volume of gas, usually air, is confined within a flexible container. As an air spring is compressed (jounce travel), the pressure of the gas within the air spring increases; and as an air spring extends (rebound travel), the pressure of the gas within the air spring decreases. Road disturbances are mainly absorbed by this compression and extension of the air springs as a function of work (w=∫F·dx). Air springs are often engineered to have a specific spring rate or spring constant, thereby controlling jounce and rebound characteristics for the desired application and for comfort.

Because an air spring may undergo countless cycles between compression and extension, the air spring must include an enclosure container for the gas that is flexible and durable. Typically, these enclosures are referred to as bellows or airsleeves and are made of cord-(fabric or metal) reinforced rubber compositions. Cord-fabric may be, but is not limited to, natural or synthetic materials.

As those skilled in the art appreciate, efforts to improve the emissions from trucks or other transportation vehicles that may be equipped with air springs has resulted in, among other things, higher operating temperatures for the engines of these vehicles. Unfortunately, however, this higher temperature has placed higher demands on those air springs that are located near the engine or the exhaust from the engine. In particular, the operating temperature of the air springs has likewise increased, which could reduce service life of the air spring, particularly the bellow. Likewise, vehicles equipped with air springs often operate in cold environments, which necessitate that the bellows have a useful low temperature operating window as well.

SUMMARY OF THE INVENTION

In one or more embodiments, the present invention provides an air spring bellow comprising a vulcanized rubber component including the at least partially vulcanized residue of hydrogenated nitrile rubber and a rubber other than hydrogenated nitrile rubber.

In one or more embodiments, the present invention provides an air bellow prepared by a process comprising the steps of preparing a vulcanizable composition that includes hydrogenated nitrile rubber, a rubber other than hydrogenated nitrile rubber, and a curative, fabricating the vulcanizable composition into an uncured air bellow, and at least partially curing the uncured air bellow.

DETAILED DESCRIPTION OF ILLUSTRATIVE EMBODIMENTS

Embodiments of the present invention are based upon the discovery that technologically useful air bellows can be manufactured from rubber compositions that include hydrogenated nitrile rubber, which may also be referred to as HNBR. In one or more embodiments, the air bellows are manufactured from rubber compositions that include a blend of hydrogenated nitrile rubber and conventional unsaturated rubber. It has unexpectedly been discovered that blends of hydrogenated nitrile rubber and conventional unsaturated rubber can provide air bellows that have an overall advantageous balance of properties including improved high temperature performance, and in certain embodiments improved low temperature performance, while maintaining service life at higher temperatures, as well as fabricability.

Air Spring Construction

Figure 1:
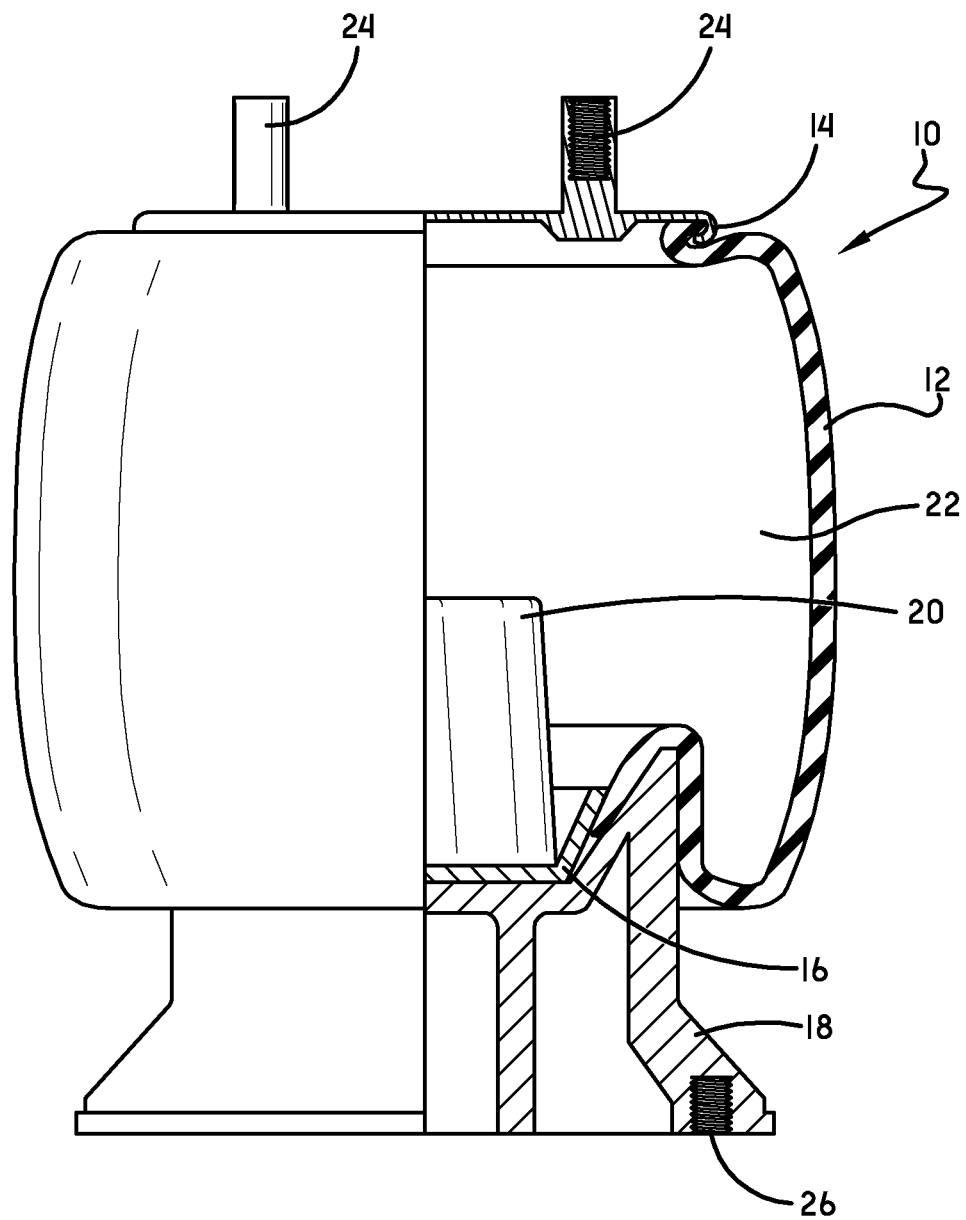
FIG. 1 is a perspective view of an exemplary air spring according to one or more embodiments of the present invention.

The construction of an air spring can be explained with reference to FIG. 1. In FIG. 1, an air spring assembly is designated generally by the numeral 10. The air spring assembly 10 includes flexible airsleeve 12, which may also be referred as bellow 12. Bead plate 14 is crimped to airsleeve 12 to form an airtight seal between bead plate 14 and airsleeve 12. Similarly, end closure 16 is molded to flexible airsleeve 12 to form an airtight seal between end closure 16 and airsleeve 12. End closure 16 of airsleeve 12 is affixed to piston 18 by a mechanical element, which is generally well known in the art, including, for example, a piston bolt (not shown). Piston 18 provides a surface for flexible airsleeve 12 to roll on during compressive (jounce) travel. Flexible air spring assembly 10 may optionally include bumper 20 to support the vehicle when there is no air in the air springs or during extreme road disturbances. Enclosed within airsleeve 12 is a volume of gas 22. Studs 24 and hole 26 are used to secure the flexible air spring assembly 10 to the mounting surface of an automobile (not shown).

Figure 2:
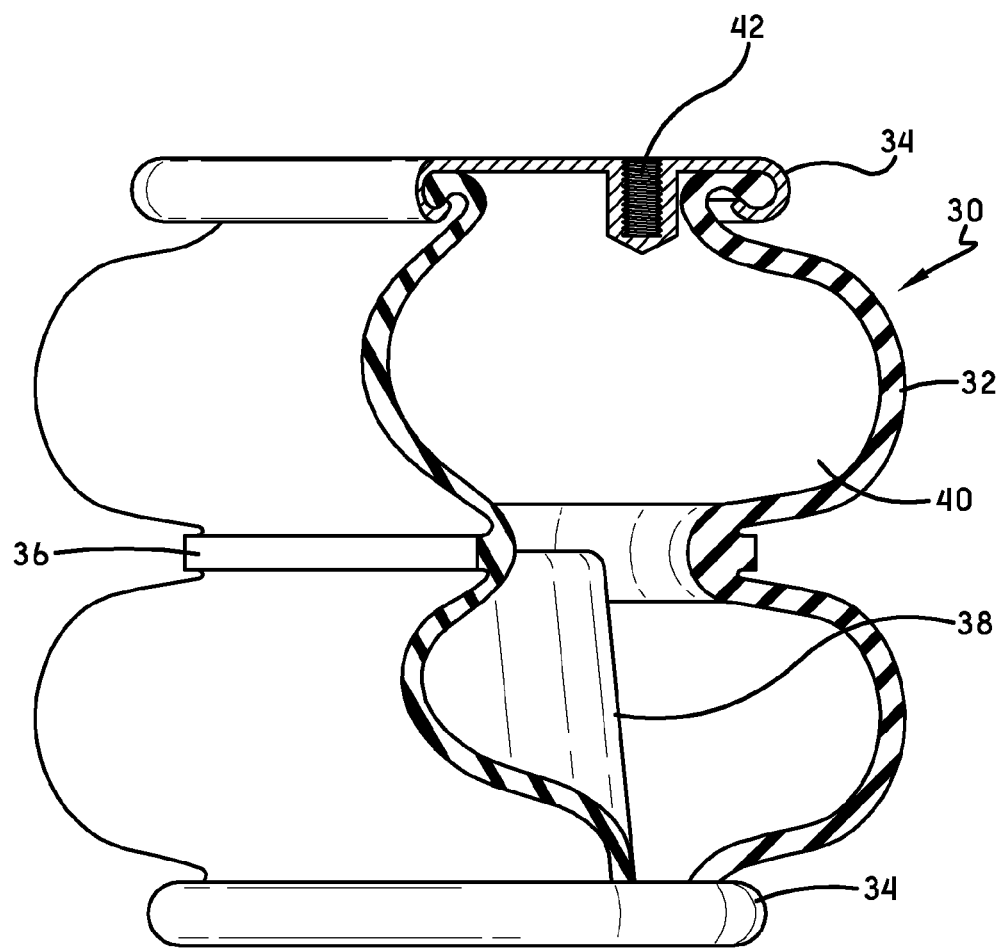
FIG. 2 is a perspective view of an exemplary air spring according to one or more embodiments of the present invention.

FIG. 2 shows an exemplary (double) convoluted air spring assembly designated generally by the numeral 30. Convoluted air spring assembly 30 includes flexible airsleeve 32. Bead plates 34 are crimped to airsleeve 32 to form an airtight seal between bead plates 34 and airsleeve 32. A girdle hoop 36 is affixed to airsleeve 32 between bead plates 34. Convoluted air spring assembly 30 may optionally include bumper 38 to support the vehicle when there is no air in the air springs or during extreme road disturbances. Enclosed within airsleeve 32 is a volume of gas 40. Blind nuts, including 42 and other blind nuts (not shown), are used to secure the convoluted air spring assembly 30 to the mounting surface of an automobile (not shown).

Figure 3:
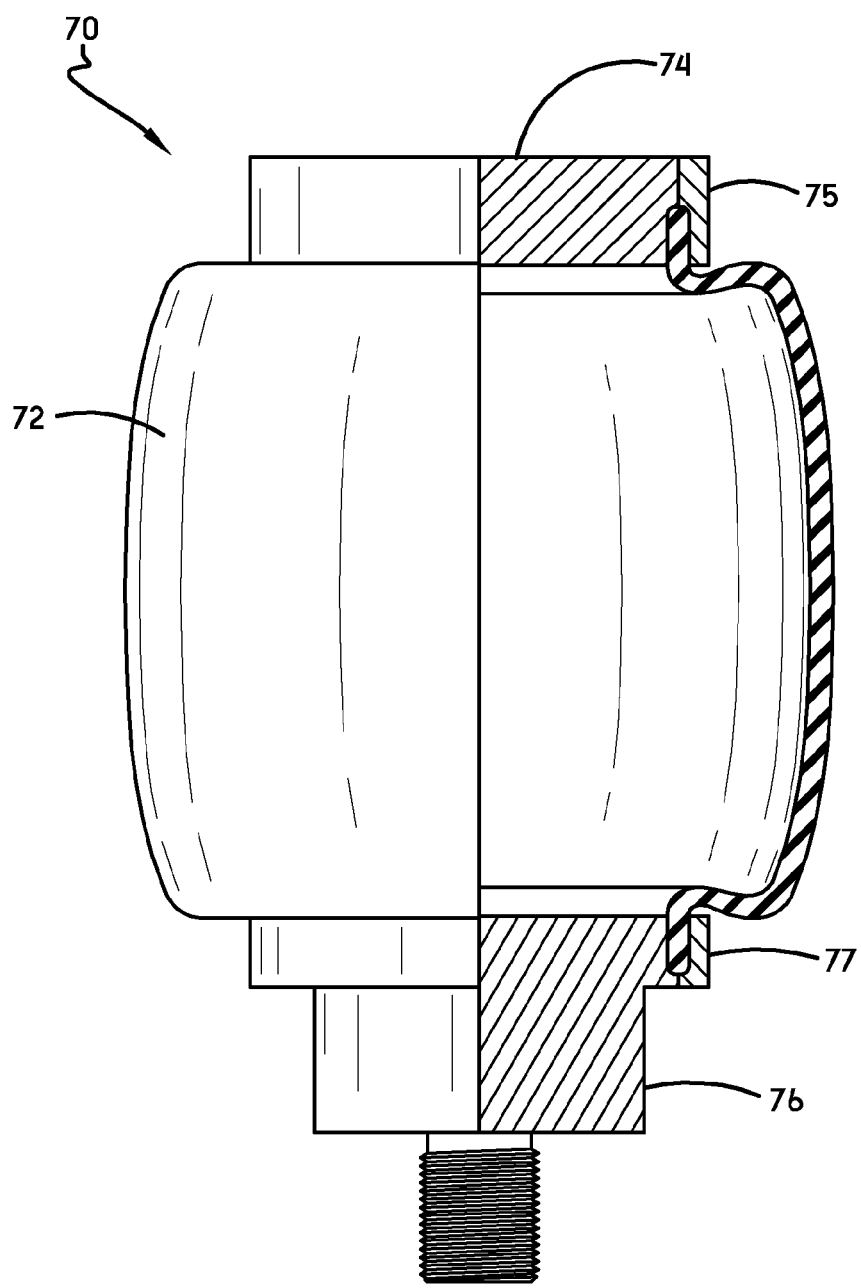
FIG. 3 is a perspective view of an exemplary air spring according to one or more embodiments of the present invention.

FIG. 3 shows an exemplary cab/seat spring assembly designated generally by the numeral 70. Cab/seat spring assembly 70 includes flexible air sleeve 72. Cab/seat plate 74 is attached to air sleeve 72 to form an air tight seal there between by using, for example, metal ring 75. An airtight seal can be made using known techniques such as those described in U.S. Pat. No. 6,474,630, which is incorporated herein by reference. Suspension plate 76 is likewise secured to airsleeve 72 via metal ring 77 to form an airtight seal there between.

Figure 4:
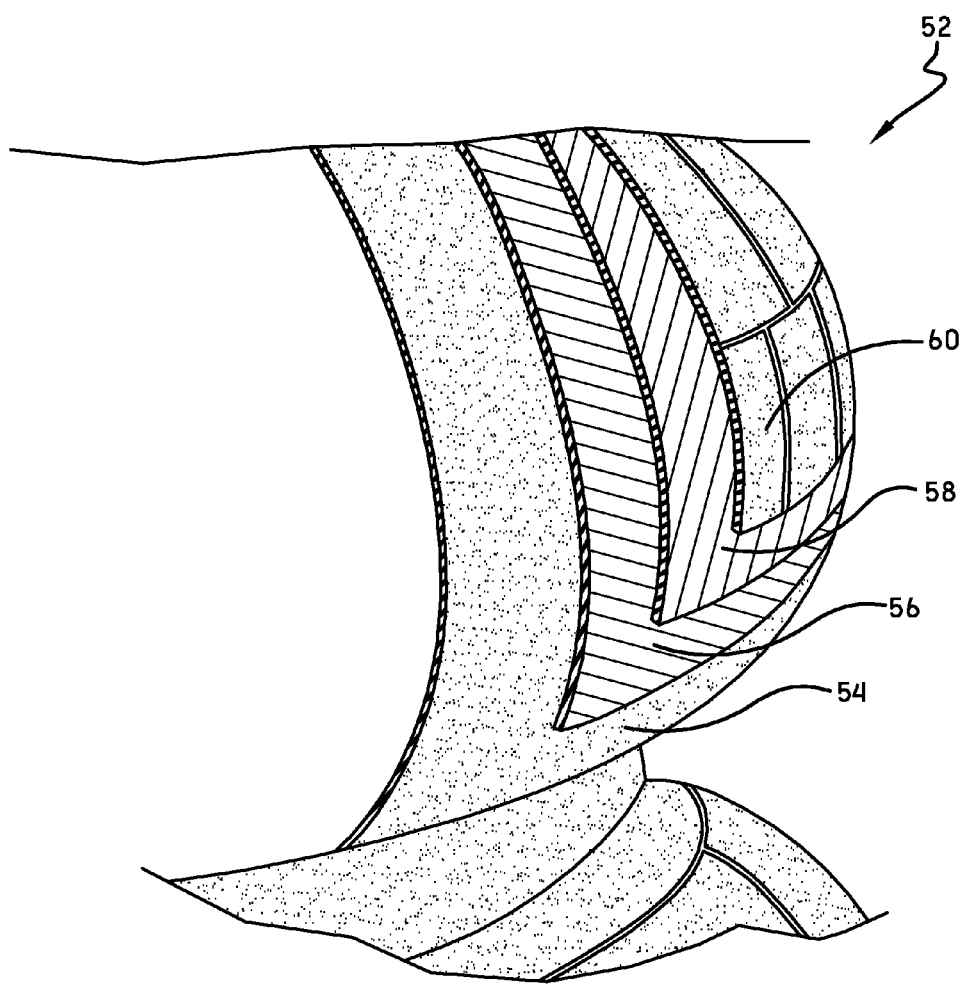
FIG. 4 is a cutaway view of an exemplary airsleeve showing its layered construction.

In one or more embodiments, airsleeves 12, 32, and 72 are made of cord-(fabric or metal) reinforced rubber and may be comprised of several layers, as shown in a cutaway view of an exemplary airsleeve 52 in FIG. 4. Exemplary airsleeve 52 features "two-ply" construction and includes four layers including: innerliner 54, first ply 56, second ply 58, and outer cover 60. Innerliner 54 and outer cover 60 may include calendared rubber. As shown, first ply 56 may include a single ply of cord-reinforced rubber with the cords at a specific bias angle, and second ply 58 may include a single ply of fabric-reinforced rubber with the same bias angle laid opposite that of first ply 56.

While the present invention is described in the context of an airsleeve and an air spring used in the suspension of an automobile, one of skill in the art will appreciate that the teachings disclosed are general and the present invention may be applied to other art relating to the air spring areas. The other areas might include, for example, air springs for seats, air springs used to support truck cabs, air springs used with buses, and the like.

Bellow Rubber Composition

One or more embodiments of the present invention are directed toward rubber compositions, which may also be referred to as vulcanizable compositions, that are useful in the manufacture of one or more layers of an air spring bellow.

The bellows of the present invention are prepared by curing a vulcanizable rubber composition that includes hydrogenated nitrile rubber, an unsaturated rubber other than hydrogenated nitrile rubber, and a cure system. Other ingredients that may be included in the vulcanizable rubber formulation include plasticizers, antioxidants, fillers, oils, curatives, and other additives that are conventionally employed in rubber compositions.

Hydrogenated Nitrile Rubber

In one or more embodiments, hydrogenated nitrile rubber, which may also be referred to as HNBR, is a hydrogenated rubber deriving from the copolymerization of a nitrile monomer, conjugated diene monomer, and optionally a termonomer such as an acrylate monomer. This copolymer may be produced by emulsion polymerization or solution polymerization.

In one or more embodiments, the HNBR may be at least 50%, in other embodiments at least 70%, in other embodiments at least 80%, and in other embodiments at least 90% hydrogenated. As those skilled in the art appreciate, the degree of hydrogentation refers to the percentage of double bonds, or unsaturation (e.g., deriving from dienes) in the copolymer that are removed (e.g. via protonation) as part of the hydrogentation process. In these or other embodiments, the HBNR is less than 99% in other embodiments less than 95%, in other embodiments less than 90%, and in other embodiments less than 85% hydrogenated. In one or more embodiments, the HNBR may be characterized by including from about 1 to about 30 mole %, in other embodiments from about 2 to about 20 mole %, in other embodiments from about 3 to about 10 mole %, and in other embodiments from about 4 to about 6 mole % unsaturation.

In one or more embodiments, the copolymer rubber to be hydrogenated is prepared by copolymerizing an unsaturated nitrile, such as acrylonitrile and methacrylonitrile, with at least one conjugated diene, such as 1,3-butadiene, isoprene, and 1,3-pentadiene. In other embodiments, the copolymer may be prepared by copolymerizing the above-mentioned unsaturated nitrile with a conjugated diene partly substituted with an unsaturated carboxylic acid ester such as methyl ester, butyl ester, and 2-ethyl ester of acrylic acid, methacrylic acid, fumaric acid, or itaconic acid, or with N-methylol acrylamide. Examples of these copolymer rubbers include acrylonitrile-butadiene copolymer rubber, acrylonitrile-isoprene copolymer rubber, acrylonitrile-butadiene-isoprene copolymer rubber, acrylonitrile-butadiene-methyl acrylate copolymer rubber, and acrylonitrile-butadiene-butyl acrylate copolymer rubber. Most suitable among them is acrylonitrile-butadiene copolymer rubber (NBR).

In one or more embodiments, the partially hydrogenated unsaturated nitrile-conjugated diene copolymer rubber may be obtained by treating an unsaturated nitrile-conjugated diene copolymer rubber by an ordinary method (for example, the methods described in British Pat. Nos. 1,198,195 and 1,558,491) to hydrogenate units derived from the conjugated diene.

In one or more embodiments, the HNBR employed in the invention may have a Mooney viscosity (ML 1+4@100° C.) in the range from 20 to 105, in other embodiments from about 40 to about 90, and in other embodiments from about 50 to about 80.

In one or more embodiments, the HNBR employed in this invention may be characterized by a specific gravity of from 0.85 to 1.20, in other embodiments from 0.90 to 1.05, and in other embodiments from 0.95 to 1.00.

In one or more embodiments, the HNBR employed in this invention may be commercially obtained.

Conventional Unsaturated Rubber

In one or more embodiments, vulcanizable elastomers other than HNBR, which may be referred to as conventional unsaturated rubber, include those polymers that are capable of being cured (also referred to as vulcanized) to form elastomeric compositions of matter including those conventionally used in the air spring art.

As those skilled in the art appreciate, exemplary vulcanizable elastomers other than HNBR include, but are not limited to, natural rubber, synthetic polyisoprene, polybutadiene, polyisobutylene-co-isoprene, polychloroprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, nitrile rubber, silicone rubber, epichlorohydrin rubber, and mixtures thereof.

In particular embodiments, the conventional unsaturated rubber includes polymers that derive from the polymerization of halogenated dienes and optionally monomer copolymerizable therewith. An exemplary halogenated diene is 2-chloro-1,3-butadiene, which is also known as chloroprene. Examples of monomer copolymerizable with chloroprene includes sulfur and 2,3-dichloro-1,3-butadiene. Homopolymers of chloroprene are generally referred to as polychloroprene. For purposes of this description, the rubbers deriving from the copolymerization of chloroprene and monomer copolymerizable therewith may be referred to as polychloroprene copolymers.

In one or more embodiments, polychloroprene or polychloroprene copolymers employed in the practice of this invention may be characterized by a Mooney viscosity ($ML_{1+4}$ at 100° C.) of at least 25, in other embodiments at least 40, in other embodiments at least 60, in other embodiments at least 80, and in other embodiments at least 100. In these or other embodiments, the polychloroprene or polychloroprene copolymers may be characterized by a Mooney viscosity ($ML_{1+4}$ at 100° C.) of less than 150, in other embodiments less than 130, in other embodiments less than 110 in other embodiments less than 80, in other embodiments less than 60, and in other embodiments less than 50. In particular embodiments, the polychloroprene or polychloroprene copolymers may be characterized by a Mooney viscosity ($ML_{1+4}$ at 100° C.) of from about 100 to about 120, and in other embodiments from about 41 to about 51.

In one or more embodiments, blends of distinct polychloroprene or polychloroprene copolymers may be employed to achieve a desirable balance of properties. These distinctions may be based upon comonomer content and/or viscosity of the polymers.

Particularly useful examples of desirable polychloroprene or polychloroprene copolymers are available from DuPont Performance Elastomers (Wilmington, Del.) under the Neoprene™ "WD" and "WRT" family designations. It is believed that Neoprene™ WD and WRT are relatively crystallization-resistant, versus Neoprene™ G-type, and are copolymers of chloroprene and 2,3-dichloro-1,3-butadiene. Neoprene™ WD exhibits a Mooney Viscosity range ($ML_{1+4}$ at 100° C.) of 100-120, while Neoprene™ WRT exhibits a Mooney Viscosity range ($ML_{1+4}$ at 100° C.) of 41-51.

Antioxidants/Antidegradants

In one or more embodiments, the vulcanizable composition of this invention may include one or more antioxidants. Useful antioxidants include bisphenol type antioxidants, diphenylamines, and zinc salts. Useful bisphenol-type antioxidants are available under the tradename Vulakanox BFK (LANXESS). Useful diphenylamine antioxidants are available under the tradename 405 (Akrochem). Useful zinc salt antioxidants are available under the tradename 58 (Akrochem).

In one or more embodiments, the vulcanizable compositions of this invention may include one or more antidegradants. Antidegradant protect the final product vulcanizate against damaging external influences such as oxidation, ozone, heat, and dynamic stresses. A suitable antidegradant is Vulkanox MB2, also known as 4- and 5-methyl-2-mercaptobenzimidazole (MMBI) and is commercially available from LANXESS (Leverkusen, Germany). Another suitable antidegradant is Wingstay 100, which is a mixed diaryl-p-phenylene type antidegradant. Wingstay 100 is commercially available. Another suitable antidegradant is IPPD, or N-isopropyl-N'-phenyl-p-phenylenediamine. IPPD is available through Flexsys (Akron, Ohio) under the tradename Santoflex IPPD. Another suitable antidegradant is 6PPD, or N-(1,3-dimethylbutyl)-N-phenyl-p-phenylenediamine. 6PPD is available through Flexsys (Akron, Ohio) under the tradename Santoflex 6PPD.

Filler

In one or more embodiments, the vulcanizable composition of this invention may include one or more reinforcing fillers and/or one or more non-reinforcing fillers. In one or more embodiments, the vulcanizable composition of this invention may include carbon black. Carbon black is virtually pure elemental carbon in the form of colloidal particles that are produced by incomplete combustion or thermal decomposition of gaseous or liquid hydrocarbons under controlled conditions. Carbon black may be added to the vulcanizable composition as a reinforcing filler to achieve the required balance of processability, hardness and tensile or tear properties. Generally, any conventional carbon black, or blends of the same, used in compounding rubber-based airsleeve formulations is suitable for use in the present invention. Particularly useful carbon black varieties include those conforming to the characteristics of ASTM N550 and ASTM N762.

In one or more embodiments, the vulcanizable composition of this invention may include silica. Useful forms of silica (silicon dioxide) include crystalline and amorphous silica. The crystalline form of silica includes quartz, tridymite and cristobalite. Amorphous silica may occur when the silicon and oxygen atoms are arranged in an irregular form as identified by X-ray diffraction. In one or more embodiments, the silica is a precipitated silica. In these or other embodiments, fumed silica is employed. Commercially available forms of silica are available from PPG Industries, Inc. (Monroeville, Pa.), Degussa Corporation (Parsippany, N.J.) and J.M. Huber Corporation (Atlanta, Ga.). One useful commercial product is Rubbersil® RS-150, which is characterized by a BET surface area of 150 m$^2$/g, tapped density of 230 g/liter, pH (5% in water suspension) of 7, SiO2 content of 98%, $Na_2SO_4$ content of 2%, and $Al_2O_3$ content of 0.2%.

Other organic fillers include coal filler and ground recycled rubber. Other useful inorganic fillers include clays, talc, mica, titanium dioxide, and calcium carbonate. Useful clays include hydrated aluminum silicates.

Oil/Plasticizers

In one or more embodiments, the vulcanizable composition of this invention may include low oil swell factices, or vulcanized oils. In specific embodiments, these compounds include sulfur vulcanized vegetable oils. These factices decrease compound nerve and may permit higher liquid plasticizer levels. Factices may also speed the incorporation of fillers and increase milling efficiency. A suitable factice is commercially available from Akrochem Corporation (Akron, Ohio) under the Akrofax tradename.

In one or more embodiments, plasticizers, which may also be referred to as softeners, include, but are not limited to, fatty acids, vegetable oils, petroleum products, coal tar products, pine products, esters, and resins. In particular embodiments, the plasticizers include esters such as dicapryilphthalate, butylcuminate, dibutylphthalate, butyllactate, glycerol chlorobenzoate, methylricinoleate, octyloleate, dioctylphthalate, or dioctylsebacate.

Tackifier

In one or more embodiments, the vulcanizable compositions of this invention may include a tackifier or tackifier resin. As is known in the art, these resins generally increase the tackiness of the composition. Natural or synthetic resins may be employed. In particular embodiments, a nitrile rubber latex is employed as a tackifier. In these or other embodiments, the tackifier may include Koresin (BASF), which is believed to be a resin of acetylene and p-t-butylphenol. Certain embodiments, selection of the tackifier and the amount of tackifier employed advantageously compensates for the lack of tackiness associate with the HNBR, which lack of tackiness would frustrate the processing of the vulcanizable composition and/or the manufacturing of the bellow.

Wax

In one or more embodiments, the vulcanizable composition of this invention may include wax. Wax is a processing aid and serves as a release agent. In one or more embodiments, the vulcanizable composition of this invention may include a low viscosity polyethylene wax. Low viscosity polyethylene wax is a release, or antisticking, agent. A useful low viscosity polyethylene wax is available from Akrochem Corporation (Akron, Ohio) under the PE-100 tradename.

Curatives and other Additives

In one or more embodiments, the vulcanizable composition of this invention includes a curative, or cure package. The cure package includes a sulfur-based compound and may also include other optional ingredients. Although one having skill in the art may appreciate other possible cure packages, an exemplary cure package includes sulfur, TMTD, zinc oxide, Vulkanox MB2 (AO2), and IPPD.

Sulfurs that are soluble or insoluble in elastomers may be used. Exemplary sulfur is Crystex OT 20, polymeric sulfur that is insoluble in elastomers. At vulcanization temperatures, Crytex OT 20 de-polymerizes to soluble sulfur and behaves similarly to what is traditionally known as "rubber maker's sulfur" and fosters the crosslinking of polymer molecules. Crystex OT 20 is commercially available from Flexsys (Akron, Ohio).

TMTD, or tetramethylthiuram disulfide, is a cure accelerant that increases the rate of cure by catalyzing the addition of sulfur chains to the rubber molecules. TMTD is commercially available from Western Reserve Chemical Corporation (Stow, Ohio).

Zinc oxide acts as a cure activator in the presence of sulfur, one or more accelerators, and unsaturated rubber to help promote the formation of sulfur cross-links during the vulcanization process.

In one or more embodiments, the vulcanizable composition of this invention may include stearic acid. Stearic acid (octadecanoic acid) is a waxy solid and has the chemical formula $C_{18}H_{36}O_2$. Stearic acid is particularly effective as a processing aid in minimizing mill and calendar roll sticking.

In one or more embodiments, the vulcanizable composition of this invention may include magnesium oxide (MgO). Magnesium oxide may neutralize trace hydrogen chloride that may be liberated by the polymer during processing, vulcanization heat aging or service. By removing the hydrogen chloride, magnesium oxide can prevent auto-catalytic decomposition resulting in greater stability. Magnesium oxide may also take part in the crosslinking process.

In one or more embodiments, the cure system may include one or more cure retarders, which may serve to slow the cure rate and ideally provide a marching cure profile. In particular embodiments, especially where the HNBR-containing vulcanizable compositions are employed to prepare the inner and outer layers of the multi-layered bellow, the cure rate of the inner and outer layers is slowed to match the cure rate of the core (i.e., cord-containing) layers. In one or more embodiments, the vulcanizable compositions of this invention are manipulated to achieve a $t_{50}$ of from about 5 to about 9 minutes, or in other embodiments from about 6 to about 8 minutes at 155° C. as determined by standard techniques using a moving die rheometer (MDR). In these or other embodiments, the vulcanizable compositions of this invention are manipulated to achieve a $t_{90}$ of from about 18 to about 22 minutes, or in other embodiments from about 19 to about 21 minutes at 155° C. In these or other embodiments, the vulcanizable compositions of this invention are manipulated to achieve a $t_{100}$ of at least 30 minutes.

Ingredient Amounts

In one or more embodiments, the vulcanizable compositions may include at least 20 weight %, in other embodiments at least 30 weight %, in other embodiments at least 40 weight %, in other embodiments at least 70 weight %, and in other embodiments at least 75 weight % HNBR, based upon the total weight of the rubber in the vulcanizable composition. In these or other embodiments, the vulcanizable compositions may include less than 95 weight %, in other embodiments less than 90 weight %, and in other embodiments less than 85 weight % HNBR, based upon the total weight of the rubber in the vulcanizable composition. In these or other embodiments, the vulcanizable compositions include from about 30 to about 95 weight %, in other embodiments from about 40 to about 92 weight %, in other embodiments from about 70 to about 90 weight %, in other embodiments from about 73 to about 87 weight %, and in other embodiments from about 77 to about 83 weight % HNBR, based on the total weight of the rubber in the vulcanizable composition.

In one or more embodiments, the vulcanizable compositions may include at least 5 weight %, in other embodiments at least 10 weight %, and in other embodiments at least 15 weight % unsaturated rubber other than HNBR, based upon the total weight of the rubber in the vulcanizable composition. In these or other embodiments, the vulcanizable compositions may include less than 80 weight %, in other embodiments less than 70 weight %, in other embodiments less than 60 weight %, in other embodiments less than 30 weight %, and in other embodiments less than 25 weight % unsaturated rubber other than HNBR, based upon the total weight of the rubber in the vulcanizable composition. In these or other embodiments, the vulcanizable compositions include from about 5 to about 80 weight %, in other embodiments from about 8 to about 70 weight %, in other embodiments from about from about 10 to about 30 weight %, in other embodiments from about 15 to about 25 weight %, and in other embodiments from about 18 to about 22 weight % unsaturated rubber other than HNBR, based upon the total weight of the rubber in the vulcanizable composition.

In one or more embodiments, the weight ratio of HNBR to conventional unsaturated rubber (i.e., unsaturated rubber other than HNBR) may be from about 10:1 to about 1:1, in other embodiments from about 8:1 to about 2:1, and in other embodiments from about 5:1 to about 3:1.

In one or more embodiments, the vulcanizable compositions may include at least 3 parts by weight, in other embodiments at least 5 parts by weight, in other embodiments at least 7 parts by weight (pbw), in other embodiments at least 10 pbw, and in other embodiments at least 12 pbw plasticizer, based on 100 parts by weight rubber (phr). In these or other embodiments, the vulcanizable compositions may include less than 25 pbw, in other embodiments less than 20 pbw, and in other embodiments less than 18 pbw plasticizer phr. In these or other embodiments, the vulcanizable compositions include from about 7 to about 22 pbw, in other embodiments from about 10 to about 20 pbw, and in other embodiments from about 12 to about 17 pbw plasticizer, based on 100 parts by weight rubber (phr).

In one or more embodiments, the vulcanizable composition may include at least 20, in other embodiments at least 30, and in other embodiments at least 40 pbw carbon black phr. In one or more embodiments, the vulcanizable composition may include less than 100, in other embodiments less than 75, and in other embodiments less than 50 pbw carbon black phr.

In one or more embodiments, the vulcanizable composition may include 0 pbw, in other embodiments at least 15, in other embodiments at least 20, and in other embodiments at least 25 pbw silica phr. In one or more embodiments the vulcanizable composition may include less than 250, in other embodiments less than 200, in other embodiments less than 90, and in other embodiments less than 80 pbw silica phr. Where both carbon black and silica are employed, the weight ratio of carbon black to silica may range from 9:1 to 0.5:1, in other embodiments from 5:1 to 1:1, and in other embodiments from 4:1 to 2:1.

In certain embodiments, the vulcanizable composition of this invention is devoid of factice. In one or more embodiments, the vulcanizable composition may include at least about 1, in other embodiments at least about 2, and in other embodiments at least about 3 pbw factice phr. In one or more embodiments, the vulcanizable composition may include less than about 10, in other embodiments less than about 8, and in other embodiments less than about 6 pbw factice phr.

In certain embodiments, the vulcanizable composition of this invention may include at least 1 part by weight, in other embodiments at least 2 parts by weight, in other embodiments at least 4 parts by weight, in other embodiments at least 5 parts by weight, in other embodiments at least 6 parts by weight, in other embodiments at least 7 parts by weight, in other embodiments at least 8 parts by weight, in other embodiments at least 9 parts by weight, and in other embodiments at least 10 parts by weight tackifier resin phr.

In these or other embodiments, the vulcanizable composition may include less than 20 pbw, in other embodiments less than 18 pbw, in other embodiments less than 16 pbw, in other embodiments less than 14 pbw, and in other embodiments less than 12 pbw tackifier phr.

Those skilled in the art will be able to select an appropriate amount of the various ingredients that can be used based upon the ultimate desired properties sought within the airsleeve of an air spring. Likewise, those skilled in the art will be able to select an appropriate amount of curative and complementary cure agents in order to achieve a desired level of cure.

Preparation of Bellow

The vulcanizable compositions for preparing one or more layers of airsleeve according to the present invention can be prepared in a conventional manner by using conventional rubber compounding equipment such as Brabender, Banbury, Werner-Pfleiderer, Sigma-blade mixer, two-roll mill, or other mixers suitable for forming viscous, relatively uniform admixtures. Mixing techniques depend on a variety of factors such as the specific types of polymers used, and the fillers, processing oils, waxes, and other ingredients used. In one or more embodiments, the ingredients can be added together in a single stage. In other embodiments, some of the ingredients such as hydrogenated nitrile rubber, carbon black, etc. can be first loaded followed by the conventional rubber. In other embodiments, the rubber (e.g., HNBR and conventional rubber) is added first followed by the other ingredients. In even other embodiments, the conventional rubber may be added at the same time as the hydrogenated nitrile rubber.

Mixing cycles generally range from about 2 to 10 minutes. In certain embodiments an incremental procedure can be used whereby the rubber and part of the ingredients are added first, and the remaining ingredients are added in additional increments. In other embodiments, part of the rubber can be added on top of the other ingredients. In other embodiments, the conventional rubber and hydrogenated nitrile rubber are added together. In one or more embodiments, two-stage mixing can be employed.

The hydrogenated nitrile rubber can be added with the conventional rubber near the beginning of the mixing cycle. (e.g., in the masterbatch) In one or more embodiments, the hydrogenated nitrile rubber is added before the cure package is added. In other embodiments, the HNBR can be added with the cure package during final mix.

When utilizing an internal mixer, the dry or powdery materials such as the carbon black can be added first, followed by the processing aids and finally the rubber to form the masterbatch. The cure package (sulfur, accelerants, antidegredants, etc.) can be added near the end of the mixing cycle and at lower temperatures to prevent premature crosslinking of the rubber. In other embodiments, the cure package can be added to the masterbatch in order to improve dispersion; this option being available in view of the saturated or substantially saturated nature of the HNBR.

In one or more embodiments, the conventional rubber, i.e. the rubber other than the HNBR, is provided or introduced to the other ingredients in the form of a latex (or at least a portion of the conventional rubber is added as a latex). It is believed that by introducing the conventional rubber as a latex, the tack of the vulcanizable composition can be increased thereby facilitating processing of the composition. For example, in one or more embodiments, a natural rubber latex, a nitrile rubber latex, and/or a polychloroprene latex may be introduced with the HNBR and other ingredients and mixed by conventional techniques including the use of an internal mixer.

Once mixed, the rubber composition can be then formed into a sheet via calendaring or combined with a reinforcing cord-(fabric or metal). The compositions of the invention can also be formed into various types of articles using other techniques such as extrusion.

Making an Airspring

The vulcanizable rubber compositions of the present invention can be formed into airsleeves of air springs by employing conventional techniques for fabricating and manufacturing air springs. Air spring and air sleeve constructions and methods of their manufacture are known in the art as exemplified in U.S. Pat. Nos. 7,250,203, 5,527,170, and 6,439,550, which are incorporated herein by reference. In order to demonstrate the practice of the present invention, the following examples have been prepared and tested. The examples should not, however, be viewed as limiting the scope of the invention. The claims will serve to define the invention.

EXAMPLES

In an effort to demonstrate the advantages of at least certain embodiments of the present invention, three vulcanizable compositions of matter that are useful for forming a layer of an air spring bellow were prepared. The ingredients employed in each composition were held constant except for the rubber employed. Table I provides the rubbers employed in each sample together with the results of testing performed on cured samples. The tests were performed according to ASTM D 412 using a microdumbell test specimen. Specifically, each sample included 50 parts by weight carbon black, 4.0 parts by weight wax, 1.5 parts by weight stearic acid, 3.0 parts by weight zinc oxide, 2.0 parts by weight hardening resin, 5.0 parts by weight softener, 2.0 parts by weight sulfur, 1.0 part by weight accelerator, and 4.0 parts by weight of an antioxidant package, per 100 parts by weight rubber. The sulfur, accelerator, and antioxidant package were added in a second mixing step. The initial mixing step achieved a drop temperature of 165° C., and the second mixing step achieved a drop temperature of 100° C. The HNBR I was obtained under the tradename Therban C 3443 and HNBR II was obtained under the tradename Terban C 4364. The test samples were cured within a press at 171° C.

TABLE I

| Sample Number | 1 | 2 | 3 |
|---|---|---|---|
| Natural Rubber | 70 | 70 | 70 |
| Butadiene Rubber (96% cis) | 30 | — | — |
| HBNR I | — | 30 | — |
| HBNR II | — | — | 30 |
| Testing at 23° C., Unaged | | | |
| Maximum Stress (MPa): | 16.4 | 18.1 | 18.2 |
| 300% Modulus (MPa): | 11.199 | 9.46 | 11.034 |
| % Strain at Break: | 394.732 | 514.064 | 462.279 |
| Testing at 100° C., Unaged | | | |
| Maximum Stress (MPa): | 7.1 | 8.3 | 9.1 |
| 300% Modulus (MPa): | — | 5.637 | 6.236 |
| % Strain at Break: | 267.187 | 477.153 | 466.507 |
| Testing @ 23° C., Aged 3 Days @ 100° C. | | | |
| Maximum Stress (MPa): | 9.2 | 13.4 | 14.3 |
| 300% Modulus (MPa): | — | — | — |
| % Strain at Break: | 186.979 | 299.244 | 278.596 |

As is evident from the data presented in the tables, the presence of the HNBR, even at the low level of 30 weight percent of the rubber component, showed marked improvement in the high temperature performance (e.g., testing at 100° C. on the unaged sample), as well as after aging (e.g., 23° C. testing after 3 days of aging at 100° C.).

Various modifications and alterations that do not depart from the scope and spirit of this invention will become apparent to those skilled in the art. This invention is not to be duly limited to the illustrative embodiments set forth herein.

What is claimed is:

1. An air spring bellow comprising:
   a vulcanized rubber component including the at least partially vulcanized residue of a vulcanizable composition comprising hydrogenated nitrile rubber and a rubber other than hydrogenated nitrile rubber, where the vulcanizable composition comprises at least 20 weight % hydrogenated nitrile rubber, based upon the total weight of the rubber in the vulcanizable composition, and where the hydrogenated nitrile rubber is at least 50% hydrogenated.

2. The composition of claim 1, where the rubber other than hydrogenated nitrile rubber is poly(chloroprene).

3. The composition of claim 1, where the hydrogenated nitrile rubber includes from about 3 to about 10 mole % unsaturation.

4. The composition of claim 1, where the hydrogenated nitrile rubber derives from an acrylonitrile-butadiene-butyl acrylate copolymer rubber.

5. The composition of claim 1, where the hydrogenated nitrile rubber has a Mooney viscosity ($ML_{1+4}$@100° C.) of from about 40 to about 90.

6. The composition of claim 1, where the hydrogenated nitrile rubber is characterized by a specific gravity of from 0.90 to about 1.05.

7. The composition of claim 1, where the vulcanizable composition includes a tackifier.

8. The composition of claim 1, where the vulcanizable composition includes a factice.

9. The composition of claim 1, where the vulcanizable composition comprises at least 5 weight % unsaturated rubber other than hydrogenated nitrile rubber, based upon the total weight of the rubber in the vulcanizable composition.

10. The composition of claim 9, where the vulcanizable composition comprises from about 3 to about 25 parts by weight plasticizer, per hundred parts by weight rubber.

11. The composition of claim 10, where the vulcanizable composition comprises from about 20 to about 100 parts by weight carbon black per hundred parts rubber.

12. The composition of claim 11, where the vulcanizable composition comprises from about 15 to about 250 parts by weight silica per hundred parts rubber.

13. The composition of claim 12, where the vulcanizable composition comprises from about 1 to about 10 parts by weight factice per hundred parts rubber.

14. The composition of claim 13, where the vulcanizable composition comprises from about 1 to about 20 parts by weight tackifier resin per hundred parts rubber.

15. The composition of claim 1, where the weight ratio of hydrogenated nitrile rubber to rubber other than hydrogenated nitrile rubber is from about 10:1 to about 1:1.

16. An air bellow prepared by a process comprising the steps of:
   i. preparing a vulcanizable composition that includes hydrogenated nitrile rubber, a rubber other than hydrogenated nitrile rubber, and a curative, where the vulcanizable composition comprises at least 20 weight % hydrogenated nitrile rubber, based upon the total weight of the rubber in the vulcanizable composition, and where the hydrogenated nitrile rubber is at least 50% hydrogentated.
   ii. fabricating the vulcanizable composition into an uncured air bellow; and
   iii. at least partially curing the uncured air bellow.

17. The composition of claim 16, where the weight ratio of hydrogenated nitrile rubber to rubber other than hydrogenated nitrile rubber is from about 10:1 to about 1:1.

* * * * *